(12) United States Patent
Majima

(10) Patent No.: US 8,457,100 B2
(45) Date of Patent: *Jun. 4, 2013

(54) MOBILE WIRELESS COMMUNICATION APPARATUS, WIRELESS COMMUNICATION APPARATUS AND COMMUNICATION PROCESSING METHOD

(75) Inventor: Taichi Majima, Yokohama (JP)

(73) Assignee: Kabushiki Kaisha Kenwood, Hachiouji-shi, Tokyo (JP)

( * ) Notice: Subject to any disclaimer, the term of this patent is extended or adjusted under 35 U.S.C. 154(b) by 1021 days.

This patent is subject to a terminal disclaimer.

(21) Appl. No.: 11/664,295

(22) PCT Filed: Sep. 29, 2005

(86) PCT No.: PCT/JP2005/018490
§ 371 (c)(1), (2), (4) Date: Mar. 29, 2007

(87) PCT Pub. No.: WO2006/036009
PCT Pub. Date: Apr. 6, 2006

(65) Prior Publication Data
US 2008/0123791 A1   May 29, 2008

(30) Foreign Application Priority Data
Sep. 30, 2004 (JP) .................................. 2004-287158

(51) Int. Cl.
  H04J 3/06   (2006.01)
(52) U.S. Cl.
  USPC ......... 370/350; 455/434; 455/455; 455/550.1
(58) Field of Classification Search
  USPC ............... 370/350; 455/434, 455, 550.1, 561
  See application file for complete search history.

(56) References Cited

U.S. PATENT DOCUMENTS 5,299,235 A  3/1994 Larsson et al.
5,390,216 A  2/1995 Bilitza et al.
(Continued)

FOREIGN PATENT DOCUMENTS

BR    9203503    4/1993
CA    2 192 516  9/1997
(Continued)

OTHER PUBLICATIONS

International Search Report (Application No. PCT/JP2005/018490) dated Jan. 17, 2006.
(Continued)

Primary Examiner — Lester Kincaid
Assistant Examiner — Steven Kelley
(74) Attorney, Agent, or Firm — Eric J. Robinson; Robinson Intellectual Property Law Office, P.C.

(57) ABSTRACT

Both a pre-word (PW) and a sync word (SW) are used to establish a synchronization or only the sync word (SW) is used to establish a synchronization in accordance with an operational status related to the synchronization in a mobile wireless communication apparatus. For example, during an initial synchronization with a control channel (110) being received, both the pre-word (PW) and the sync word (SW) are used to establish a synchronization when a calculation result in a synchronization calculating part exceeds a predetermined threshold value only once. During an initial synchronization with a direct communication channel (112) being received, both the pre-word (PW) and the sync word (SW) are used to establish a synchronization when the calculation result exceeds the predetermined threshold value once; or alternatively, only the sync word (SW) is used to establish a synchronization when the calculation result successively exceeds the predetermined threshold value twice. According to the present invention, the sync word is shortened so as to quickly establish a communication link, and the sync detection can be performed with high precision.

4 Claims, 9 Drawing Sheets

| RADIO CHANNEL OF RECEPTION OBJECT | OPERATION STATUS CONCERNING SYNCHRONIZATION | METHOD OF ACQUIRING SYNCHRONIZATION | | SYNCHRONIZATION CONDITION |
|---|---|---|---|---|
| | | PW+SW | ONLY SW | |
| CONTROL CHANNEL | INITIAL SYNCHRONIZATION | O | X | ONCE |
| | RE-SYNCHRONIZATION | O | X | ONCE |
| | SYNCHRONIZATION MAINTENANCE | X | O | ONCE |
| PHYSICAL COMMUNICATION CHANNEL | INITIAL SYNCHRONIZATION | X | O | ONCE |
| | RE-SYNCHRONIZATION | X | O | TWICE |
| | SYNCHRONIZATION MAINTENANCE | X | O | ONCE |
| DIRECT COMMUNICATION CHANNEL | INITIAL SYNCHRONIZATION | O | O | ONCE/TWICE |
| | RE-SYNCHRONIZATION | O | O | ONCE/TWICE |
| | SYNCHRONIZATION MAINTENANCE | X | O | ONCE |

U.S. PATENT DOCUMENTS

| | | | |
|---|---|---|---|
| 5,854,592 A * | 12/1998 | Kushita | 340/825.21 |
| 5,898,743 A | 4/1999 | Shoji et al. | |
| 6,693,983 B1 | 2/2004 | Moher et al. | |
| 6,765,895 B1 | 7/2004 | Watanabe | |
| 6,891,815 B1 * | 5/2005 | Song | 370/335 |
| 7,079,515 B1 * | 7/2006 | Dent et al. | 370/337 |
| 7,187,903 B1 * | 3/2007 | Febvre et al. | 455/13.2 |
| 7,848,405 B2 | 12/2010 | Higure et al. | |
| 2004/0192201 A1 | 9/2004 | Febvre et al. | |
| 2009/0202025 A1 * | 8/2009 | Majima | 375/354 |

FOREIGN PATENT DOCUMENTS

| | | |
|---|---|---|
| CA | 2 289 838 | 9/2000 |
| CA | 2 463 797 | 9/2000 |
| CA | 2 077 269 | 8/2003 |
| CN | 1161611 | 10/1997 |
| DE | 693 30 174 | 1/1994 |
| EP | 0 579 039 | 1/1994 |
| EP | 1 035 667 | 9/2000 |
| EP | 1 411 648 | 4/2004 |
| EP | 1 411 649 | 4/2004 |
| GB | 2 259 634 | 3/1993 |
| GB | 2 347 828 | 9/2000 |
| JP | 05-219041 | 8/1993 |
| JP | 06-046048 | 2/1994 |
| JP | 09-247114 | 9/1997 |
| JP | 10-022989 | 1/1998 |
| JP | 11-027720 | 1/1999 |
| JP | 2000-269876 | 9/2000 |
| JP | 2004-254069 | 9/2004 |

OTHER PUBLICATIONS

International Preliminary Examination Report (Application. No. PCT/JP2005/018490) dated Apr. 12, 2007.
European Search Report (Application No. 09005328.1) dated Jan. 17, 2011.
Supplementary European Search Report (Application No. 05790415.3) dated Jan. 17, 2011.
Written Notification of Reason for Refusal (Application No. 2009-288981) dated Sep. 22, 2011.
Written Notification of Reason for Refusal (Application No. 2009-288982) dated Sep. 16, 2011.

* cited by examiner

FIG. 2
(A) FRAME OF CONTROL CHANNEL 110
(B) FRAME OF PHYSICAL COMMUNICATION CHANNEL 111
(C) FRAME OF DIRECT COMMUNICATION CHANNEL 112
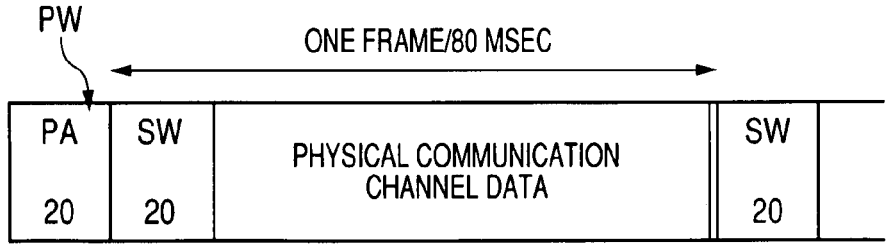

FIG. 5

| RADIO CHANNEL OF RECEPTION OBJECT | OPERATION STATUS CONCERNING SYNCHRONIZATION | METHOD OF ACQUIRING SYNCHRONIZATION | | SYNCHRONIZATION CONDITION |
|---|---|---|---|---|
| | | PW+SW | ONLY SW | |
| CONTROL CHANNEL | INITIAL SYNCHRONIZATION | ○ | × | ONCE |
| | RE-SYNCHRONIZATION | ○ | × | ONCE |
| | SYNCHRONIZATION MAINTENANCE | × | ○ | ONCE |
| PHYSICAL COMMUNICATION CHANNEL | INITIAL SYNCHRONIZATION | × | ○ | ONCE |
| | RE-SYNCHRONIZATION | × | ○ | TWICE |
| | SYNCHRONIZATION MAINTENANCE | × | ○ | ONCE |
| DIRECT COMMUNICATION CHANNEL | INITIAL SYNCHRONIZATION | ○ | ○ | ONCE/TWICE |
| | RE-SYNCHRONIZATION | ○ | ○ | ONCE/TWICE |
| | SYNCHRONIZATION MAINTENANCE | × | ○ | ONCE |

*FIG. 8*
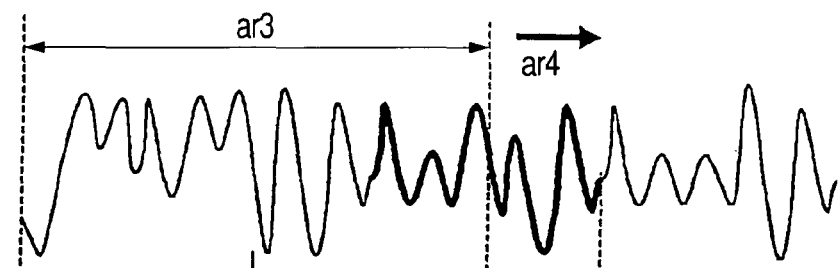
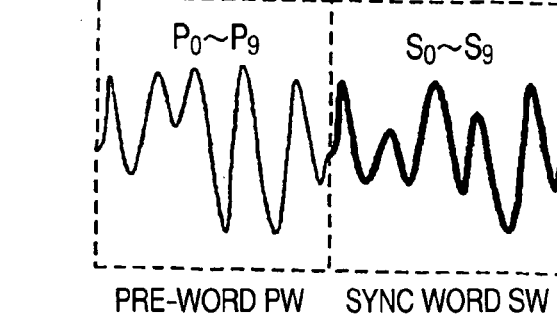
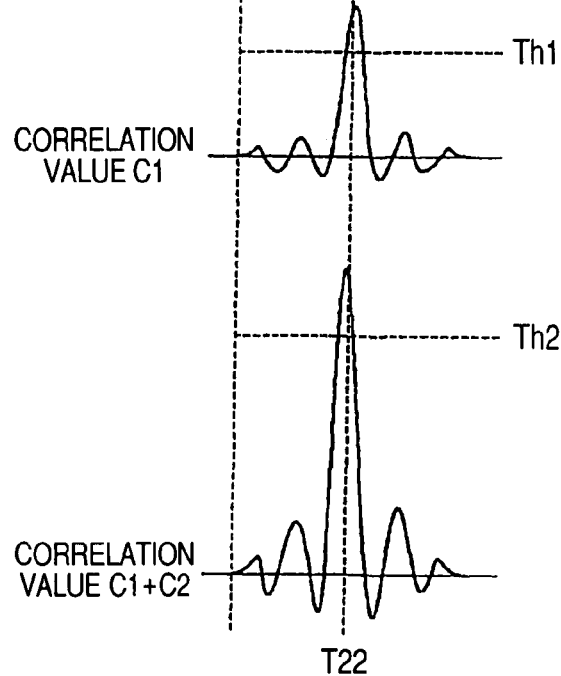

MOBILE WIRELESS COMMUNICATION APPARATUS, WIRELESS COMMUNICATION APPARATUS AND COMMUNICATION PROCESSING METHOD

TECHNICAL FIELD

The present invention relates to a mobile wireless communication apparatus, a wireless communication apparatus, and a communication processing method.

BACKGROUND ART

There is known a mobile wireless communication system that makes wireless communication possible using radio channels such as a control channel, a physical communication channel, and a direction communication channel. Here, the control channel is a radio channel used between a base station and mobile stations in order to perform a call and reception of a call in the mobile stations and other kinds of communication control. The physical communication channel is a radio channel used between the base station and the mobile stations such that each of the mobile stations performs a call and data communication with the other mobile stations and stationary terminals (e.g., a stationary telephone and a network-connected computer terminal) via a mobile communication network. The direct communication channel is a radio channel used such that each of the mobile stations directly performs a call and data communication with the other mobile stations without the intervention of the base station.

In digital communication using such radio channels, transmission data may be transmitted as a predetermined frame structure (e.g., Non-Patent Document 1). FIG. 9 shows frame formats of a control channel (a physical control channel), a physical communication channel, and a direct communication channel defined in p. 115 to 116 in the second issue of Association of Radio Industries and Businesses "Narrow Band Digital Communication System (SCPC/FDMA) Standard ARIB STD-T61, ver. 1.0, second issue" (May 27, 1999, p. 115 to 117, p. 171 to 174) as ARIB STD-T61 that is the standard of a narrow band digital radio system.

Here, sync words used for frame synchronization often have an identical length in all of the control channel, the physical communication channel, and the direct communication channel. In an example shown in FIG. 9, all sync words are fixed to 20 bits. Sync words of a fixed length are defined in ARIB STD-27 that is the standard of a PDC (Personal Digital Cellular) as a mobile telephone system. It is possible to share detection of frame synchronization in digital signal processing among the channels and simplify processing by standardizing lengths of the sync words as an identical length. For example, when the control channel is shifted to the physical communication channel or when the direct communication channel is started, in order to improve synchronization performance, a special frame for synchronization (a synchronization burst) is used. In this case, sync words longer than usual (i.e., having 32 bits) are used.

As a method of capturing sync words in a communication apparatus on a reception side, various methods are known. For example, a large number of methods of capturing sync words by specifying a correlation value between a sync words known on the reception side and a baseband signal waveform or the like demodulated from a reception signal according to a predetermined arithmetic processing are used. In the standard of ARIB STD-T61 described above, it is judged that, with one frame as 40 msec (milliseconds), synchronization is established when a sync word of 20 bits is successfully received twice. Therefore, sync words for 40 bits are used in a period of 80 msec until synchronization is established.

In a micro-cell system such as the PDC, the control channel and the physical communication channel are not always provided by an identical base station. Therefore, it is technically difficult to always maintain timing between the control channel and the physical communication channel constant. Because of such a fact, the standard described above does not specifically define frame timing between the control channel and the physical communication channel.

When wireless communication is performed using the physical communication channel and the direct communication channel, it is required to quickly establish a communication link between a transmission side and a reception side. When a delay occurs in establishment of the communication link, for example, a problem occurs in that the beginning in a call is cut. In addition, when digital sound data is transmitted and received, an information amount increases to an enormous amount. An information amount that should be transmitted in the physical communication channel and the direct communication channel may increase compared with that in the control channel. As a modulation system having satisfactory transmission efficiency, a QPSK (Quadrature Phase Shift Keying) modulation system is known. The QPSK modulation system is adopted in the PDC and a mobile wireless communication system conforming to the standard of ARIB STD-T61. However, it is also known that, in the QPSK modulation system, it is difficult to cover a wide area with one base station.

In a mobile wireless communication system in which data communication is performed, widening of a band of an occupied frequency is in progress in order to improve communication speed (rate). On the other hand, in a radio apparatus mainly used for voice call, narrowing of a band of a radio channel is in progress in order to improve efficiency of use of a frequency. In the radio channel having a narrowed band, information transmission speed (capacity) inevitably falls. Therefore, the length (the number of bits) of a sync word is preferably smaller. However, when the sync word is shortened, performance of frame synchronization is deteriorated. In particular, when there are a lot of noise on the radio channel, there is a problem in that a rate of normally establishing synchronization falls to cause an increase in mis-synchronization.

In a mobile wireless communication system set in a suburb or the like in the United States, in order to make it possible to cover a wide area with one base station, a power amplifier with high power may be used at a transmission output stage in a base station. In a modulation system (e.g., QAM: Quadraple Amplitude Modulation) in which an envelope of a modulated wave signal is nonlinear, it is necessary to perform amplification using only a part where linearity can be maintained in an input/output characteristic of the power amplifier and power efficiency in the power amplifier falls. Therefore, it is preferable to use modulation systems such as the FM (Frequency Modulation) and the PM (Phase Modulation) in which an envelope of a modulated wave signal is substantially linear. However, in the FSK (Frequency Shift Keying) modulation system, transmission efficiency is about half compared with that in the QPSK modulation system and information transfer speed (capacity) falls. In this case, as in the above case, the length of a sync word is preferably small. However, when the sync word is shortened, the problem described above occurs.

The invention has been devised in view of the above-mentioned circumstances and it is an object of the invention to provide a mobile wireless communication apparatus and the like that makes it possible to establish a communication link by reducing the length of a sync work to reduce time required for establishment of synchronization and makes sync detection with high precision possible.

DISCLOSURE OF THE INVENTION

In order to attain the object, a mobile wireless communication apparatus according to a first aspect of the invention includes demodulating means for receiving a radio signal transmitted on a predetermined radio channel and demodulating a baseband signal and frame synchronizing means for detecting at least a predetermined sync word from a symbol sequence represented by the baseband signal demodulated by the demodulating means and acquiring frame synchronization. The frame synchronizing means operates to execute, when a baseband signal is demodulated by the demodulating means from a radio signal transmitted on a control channel provided from a base station in the radio channel, a first detection operation for detecting, according to which of initial synchronization, re-synchronization, or synchronization maintenance a state of synchronization is, only a sync word from plural frames in which a sync word formed by a predetermined code pattern is arranged at the front of each of the frames and, on the other hand, a post field including a pre-word formed by a code pattern different from the sync word is arranged at the end of each of the frames and a second detection operation for detecting both the sync word and the pre-word.

Preferably, when a baseband signal is demodulated by the demodulating means from a radio signal transmitted on the control channel, the frame synchronizing means operates to judge that frame synchronization is successfully acquired when the first detection operation is executed to successfully detect a sync word once in the case in which a status of synchronization is initial synchronization or re-synchronization or the second detection operation is executed to successfully detect both a sync word and a pre-word once in the case in which a status of synchronization is synchronization maintenance.

It is desirable that the frame synchronizing means executes, when a baseband signal is demodulated by the demodulating means from a radio signal transmitted on a physical communication channel provided from a base station in the radio channel, the first detection operation for detecting only a sync word from plural frames in which a sync word is arranged at the front of each of the frames.

It is desirable that, when a baseband signal is demodulated by the demodulating means from a radio signal transmitted on the physical communication channel, the frame synchronizing means judges that frame synchronization is successfully acquired when a sync word is successfully detected once in the case in which a status of synchronization is initial synchronization or synchronization maintenance or when a sync word is successfully detected plural times in the case in which a status of synchronization is re-synchronization.

It is desirable that the frame synchronizing means executes, when a baseband signal is demodulated by the demodulating means from a radio signal transmitted on a direct communication channel between the base station and other mobile stations in the radio channel, the first detection operation or the second detection operation from plural frames in which a preamble including a pre-word is arranged at the front of each of the frames and, on the other hand, a sync word is arranged in each of the frames at the start of transmission according to whether a status of synchronization is initial synchronization, re-synchronization, or synchronization maintenance.

It is desirable that, when a baseband signal is demodulated by the demodulating means from a radio signal transmitted on the direct communication channel, the frame synchronizing means judges that frame synchronization is successfully acquired when a sync word is successfully detected plural times or a sync word and a pre-word are successfully detected once in the case in which a status of synchronization is initial synchronization or re-synchronization or when a sync word is successfully detected once in the case in which a status of synchronization is synchronization maintenance.

It is desirable that, when the first detection operation is executed, the frame synchronizing means judges that a sync word is successfully detected when the frame synchronizing means compares a correlation value between a symbol sequence represented by a baseband signal demodulated by the demodulating means and the sync word with a first threshold value decided in advance and judges that the correlation value exceeds the first threshold value and, when the second detection operation is executed, judges that a sync word and a pre-word are successfully detected when the frame synchronizing means compares a sum of a correlation value between the symbol sequence represented by the baseband signal demodulated by the demodulating means and the sync word and a correlation value between the symbol sequence represented by the baseband signal demodulated by the demodulating means and the pre-word with a second threshold value decided in advance and judges that the sum exceeds the second threshold value.

It is desirable that a frame transmitted on a control channel and a frame transmitted on a physical communication channel provided from a base station in the radio channel are transmitted at identical timing.

A wireless communication apparatus according to a second aspect of the invention is a wireless communication apparatus that transmits a radio signal transmitted on a predetermined radio channel. The wireless communication apparatus operates to transmit, on a control channel in the radio channel, a wireless signal for transmitting a symbol sequence in which, in plural frames consecutively transmitted, a sync word formed by a predetermined code pattern is arranged at the front of each of the frames and, on the other hand, a post field including a pre-word formed by a code pattern different from the sync word is arranged at the end of each of the frames, transmits, on a physical communication channel in the radio channel, a radio signal for transmitting a symbol sequence in which, in plural frames consecutively transmitted, a sync word is arranged at the front of each of the frames, and transmits a frame transmitted on the control channel and a frame transmitted on the physical communication channel at identical timing.

A communication processing method according to a third aspect of the invention is a communication processing method performed by a mobile wireless communication apparatus that performs wireless communication between a base station and any one of other mobile stations by transmitting and receiving a radio signal transmitted on a predetermined radio channel. The communication processing method includes a demodulating step of receiving a radio signal and demodulating a baseband signal and a frame synchronizing step of detecting at least a predetermined sync word from a symbol sequence represented by the baseband signal demodulated in the demodulating step and acquiring frame synchronization. In the frame synchronizing step, when a baseband signal is demodulated in the demodulating step from a radio signal transmitted on a control channel provided from the base station in the radio channel, a series of judgment processing for judging that, from plural frames in which a sync word formed by a predetermined code pattern is arranged at the front of each of the frames and, on the other hand, a post field including a pre-word formed by a code pattern different from the sync word is arranged at the end of each of the frames, frame synchronization is successfully acquired when a first detection operation for detecting only a sync word is executed and a sync word is successfully detected once in the case in which a status of synchronization is initial synchronization or re-synchronization or when a second detection operation for detecting both a sync word and a pre-word is executed and the sync word and the pre-word are successfully detected once in the case in which a status of synchronization is synchronization maintenance, when a baseband signal is demodulated in the demodulating step from a radio signal transmitted on a physical communication channel provided from the base station in the radio channel, judging that, from plural frames in which a sync word is arranged at the front of each of the frames, frame synchronization is successfully acquired when a sync word is successfully detected once in the case in which a status of synchronization is initial synchronization or synchronization maintenance or when a sync word is successfully detected plural times in the case in which a status of synchronization is re-synchronization, and, when a baseband signal is demodulated in the demodulating step from a radio signal transmitted on a direct communication channel between the base station and other mobile stations in the radio channel, judging that frame synchronization is successfully acquired when a sync word is successfully detected plural times or when a sync word and a pre-word are successfully detected once in the case in which a status of synchronization is initial synchronization or re-synchronization or when a sync word is successfully detected once in the case in which a status of synchronization is synchronization maintenance.

It is desirable that, when the first detection operation is executed, in the frame synchronizing step, it is judged that a sync word is successfully detected when a correlation value between a symbol sequence represented by a baseband signal demodulated in the demodulating step and the sync word is compared with a first threshold value decided in advance and it is judged that the correlation value exceeds the first threshold value and, when the second detection operation is executed, it is judged that a sync word and a pre-word are successfully detected when a sum of a correlation value between the symbol sequence represented by the baseband signal demodulated in the demodulating step and the sync word and a correlation value between the symbol sequence represented by the baseband signal demodulated in the demodulating step and the pre-word are compared with a second threshold value decided in advance and it is judged that the sum exceeds the second threshold value.

It is desirable that a frame transmitted on a control channel and a frame transmitted on a physical communication channel provided from a base station in the radio channel are transmitted at identical timing.

BRIEF DESCRIPTION OF THE DRAWINGS

FIG. 2 is a diagram showing an example of a frame structure in digital data transmitted in each of a control channel, a physical communication channel, and a direct communication channel;

FIG. 5 is a table showing an example of setting for acquiring synchronization in a mobile wireless communication apparatus;

FIG. 8 is a diagram for explaining a specific example of an operation for acquiring synchronization using both a pre-word and a sync word.

ADVANTAGES OF THE INVENTION

According to the present invention, it is possible to quickly establish a communication link by shortening a sync word and perform sync detection with high precision.

BEST MODE FOR CARRYING OUT THE INVENTION

Figure 1:
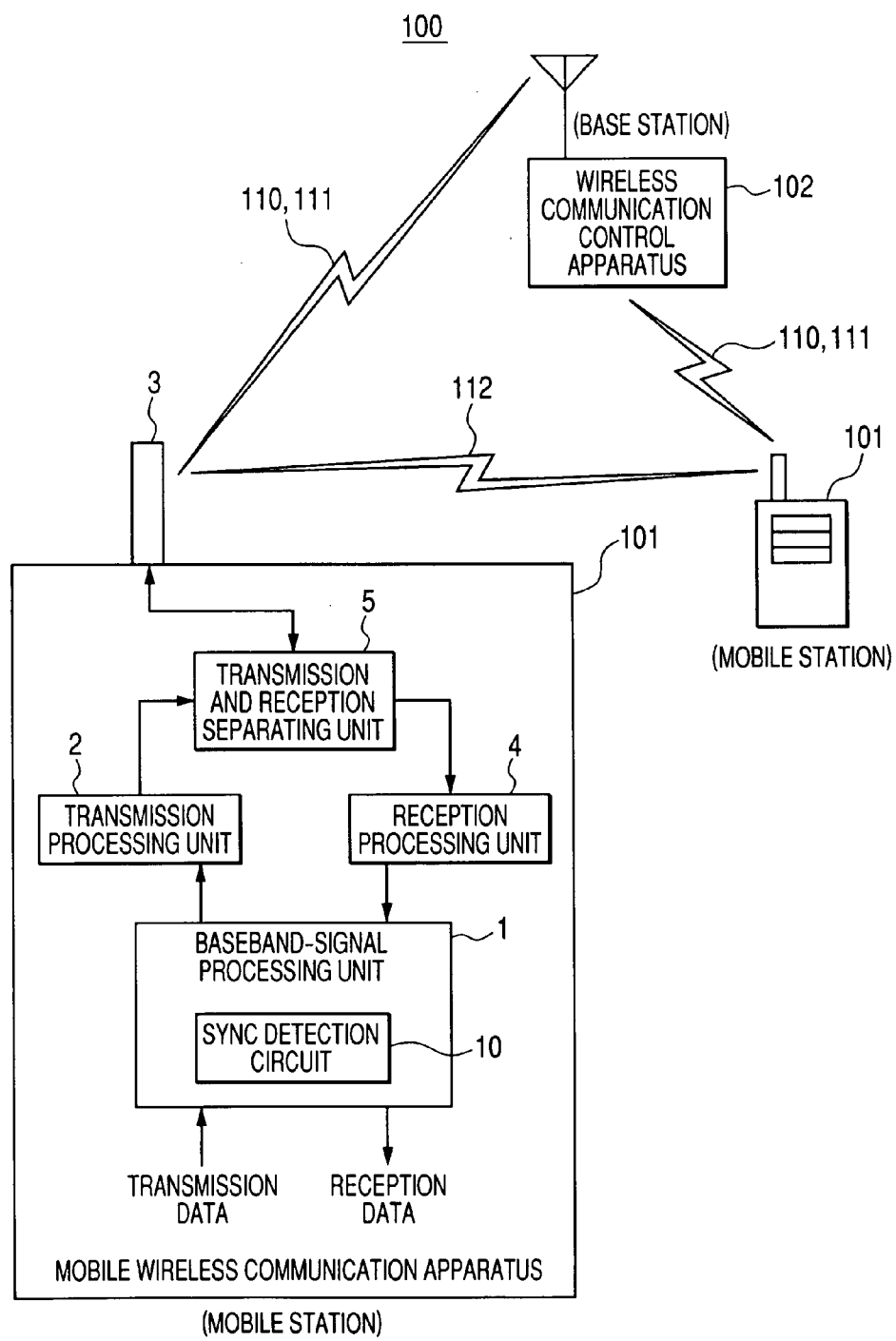
FIG. 1 is a diagram showing an example of a structure of a mobile wireless communication system according to an embodiment of the invention.

A mobile wireless communication system 100 according to an embodiment of the invention will be hereinafter explained in detail with reference to the drawings. This mobile wireless communication system 100 includes, for example as shown in FIG. 1, plural mobile wireless communication apparatuses 101 serving as mobile stations and at least one (in general, plural) wireless communication control apparatus 102 serving as a base station. In FIG. 1, as an example, two mobile wireless communication apparatuses 101 and one wireless communication control apparatus 102 are shown. For example, the mobile wireless communication system 100 only has to be a ground mobile wireless communication system of a large zone system in which the wireless communication control apparatus 102 serving as the base station covers a wide area compared with a micro-cell system such as a PDC.

Each of the mobile wireless communication apparatuses 101 makes it possible to perform a voice call (conversation) with the other mobile wireless communication apparatuses 101, other communication terminals network-connected to the wireless communication control apparatus 102, and the like by transmitting and receiving a radio frequency (RF) signal between the mobile wireless communication apparatus 101 and the wireless communication control apparatus 102 serving as the base station. In wireless communication between each of the mobile wireless communication apparatuses 101 and the wireless communication control apparatus 102, a control channel 110 and a physical communication channel 111 are used. Each of the mobile wireless communication apparatuses 101 can directly transmit and receive an RF signal between the mobile wireless communication apparatus 101 and the other mobile wireless communication apparatuses 101 without the intervention of the base station and perform voice call and the like by using the direct communication channel 112.

On radio channels such as the control channel 110, the physical communication channel 111, and the direct communication channel 112, an RF signal modulated by a predetermined digital modulation system (e.g., Quadrature FSk [Frequency Shift Keying]), whereby digital data having a predetermined frame structure is transmitted. FIGS. 2(A) to 2(C) are diagrams showing an example of a frame structure in digital data transmitted on each of the control channel 110, the physical communication channel 111, and the direct communication channel 112.

The digital data having the frame structures shown in FIGS. 2(A) and 2(B) is transmitted from the wireless communication control apparatus 102 serving as the base station to each of the mobile wireless communication apparatuses 101. A frame length in the digital data transmitted from the wireless communication control apparatus 102 is set to 80 msec and communication speed (rate) of the digital data is set to 4800 bps. As shown in FIG. 2(A), on the control channel 110, digital data of a frame structure in which a sync word SW of 20 bits formed by a predetermined code pattern is arranged at the front of a frame and a post field PF of 20 bits is arranged at the end of the frame is transmitted. In this structure, compared with the standard of ARIB STD-T61, communication speed (rate) is a half of that in the standard ARIB STD-T61 and a frame length is twice as large that in the standard ARIB ST-T61. On the other hand, the sync word SW has 20 bits per 80 msec, which is a half of that in the standard ARIB STD-T61.

The wireless communication control apparatus 102 consecutively sends the digital data having the frame structure shown in FIG. 2(A) over plural frames using the control channel 110. Therefore, in front of the sync word SW of each of the frames, the post field PF in a frame sent immediately before the frame is arranged.

As shown in FIG. 2(B), on the physical communication channel 111, digital data of a frame structure in which the sync word SW is arranged at the front of a frame and, on the other hand, the post field PF is not included unlike the control channel 110 is transmitted. As shown in FIG. 2(C), on the direct communication channel 112, digital data of a frame structure in which a preamble PA of 20 bits is arranged at the front of a frame at the start of transmission and the sync word SW of 20 bits is arranged at the front of each of frames (following the preamble PA in the frame at the start of transmission) is transmitted.

The post field PF included in the frame shown in FIG. 2(A) and the preamble PA included in the frame shown in FIG. 2(C) are constituted by a pre-word PW formed by an identical code pattern. The pre-word PW only has to be, for example, a pre-word decided in advance as a code pattern different from the sync word SW. As an example, all post fields PF and preambles PA only have to be constituted by an identical pre-word PW. As another example, the pre-word PW serving as an identical code may be included in several bits in latter halves in the post field PF and the preamble PA.

When each of the mobile wireless communication apparatuses 101 performs communication via the base station, an FDMA (Frequency Division Multiple Access) system for allocating the physical communication channel 111 from the control channel 110 provided by the wireless communication control apparatus 102 serving as the base station is used. On the other hand, when plural (e.g., two) mobile wireless communication apparatuses 101 directly perform communication without the intervention of the base station, an SCPC (Single Channel Per Carrier) system without allocation is used.

Each of the mobile wireless communication apparatuses 101 has a substantially identical structure. For example, as shown in FIG. 1, the mobile wireless communication apparatus 101 includes a baseband-signal processing unit 1, a transmission processing unit 2, an antenna 3, a reception processing unit 4, and a transmission and reception separating unit 5.

The baseband-signal processing unit 1 is inputted with transmission data from the outside and generates a baseband signal for digital transmission and is inputted with a baseband signal from the reception processing unit 4, extracts reception data, and outputs the reception data to the outside. The transmission data inputted to the baseband-signal processing unit 1 may be transmission data captured from the outside of the mobile wireless communication apparatus 101 or may be transmission data generated by a not-shown data processing unit in the mobile wireless communication apparatus 101. For example, the mobile wireless communication apparatus 101 may include a data processing unit or the like that generates information data indicating sound and an image captured from the outside.

The transmission processing unit 2 is a unit for generating a radio signal for transmission corresponding to the baseband signal for digital transmission generated by the baseband-signal processing unit 1. For example, the transmission processing unit 2 performs predetermined digital modulation (e.g., Quadrature FSK [Frequency Shift Keying] modulation) in response to the baseband signal for digital transmission. The transmission processing unit 2 performs frequency conversion (up-convert), power amplification, and the like for a modulated wave signal generated by a modulation operation and, then, supplies the modulated wave signal to the antenna 3 via the transmission and reception separating unit 5 to cause the mobile wireless communication apparatus 101 to send a radio signal.

The reception processing unit 4 applies low-noise amplification, frequency conversion (down-convert), and the like to a reception signal received by the antenna 3 and, then, performs predetermined digital demodulation to reproduce the baseband signal. The baseband signal reproduced by the reception processing unit 4 is supplied to the baseband-signal processing unit 1. The transmission and reception separating unit 5 is a duplexer that prevents an output of the transmission processing unit 2 from invading the side of the reception processing unit 4 and prevents an input of the reception processing unit 4 from invading the side of the transmission processing unit 2.

Figure 3:
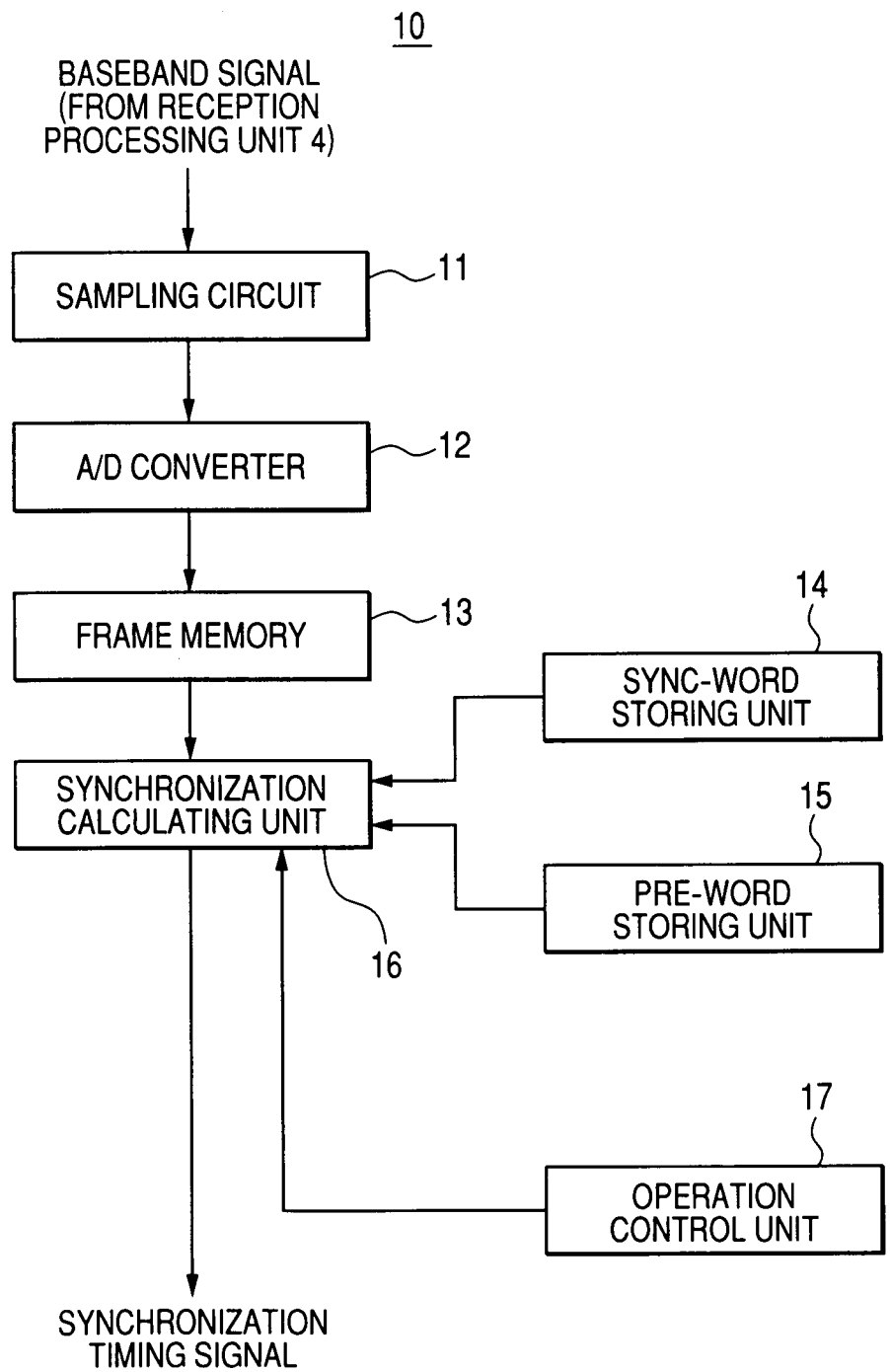
FIG. 3 is a diagram showing an example of a structure of a sync detection circuit.

In the structure described above, the baseband-signal processing unit 1 includes a sync detection circuit 10 to which the baseband signal from the reception processing unit 4 is inputted. FIG. 3 is a diagram showing an example of a structure of the sync detection circuit 10. As shown in FIG. 3, the sync detection circuit 10 includes a sampling circuit 11, an A/D (Analog-to-Digital) converter 12, a frame memory 13, a sync-word storing unit 14, a pre-word storing unit 15, a synchronization calculating unit 16, and an operation control unit 17.

The sampling circuit 11 is a circuit for sampling the baseband signal inputted from the reception processing unit 4 at a predetermined sampling rate. For example, in the sampling circuit 11, a sampling frequency only has to be set in advance such that one symbol in a symbol data sequence transmitted by the baseband signal can be sampled plural times. The A/D converter 12 converts the baseband signal sampled by the sampling circuit 11 into digital data. The digital data generated by the A/D converter 12 is stored in the frame memory 13. The frame memory 13 temporarily stores the digital data generated by the A/D converter 12 according to, for example, an FIFO (First In First Out) system.

The sync-word storing unit 14 has stored therein in advance data indicating code patterns of the sync words SW included in the respective frames of the control channel 110, the physical communication channel 111, and the direct communication channel 112 shown in FIGS. 2(A) to 2(C). The pre-word storing unit 15 has stored therein in advance data indicating code patterns of the pre-words PW used in the post field PF included in the frame of the control channel 110 shown in FIG. 2(A) and the preamble PA included in the frame of the direct communication channel 112 shown in FIG. 2(C).

The synchronization calculating unit 16 executes arithmetic processing for establishing bit synchronization and frame synchronization on the basis of the digital data stored in the frame memory 13 and the data stored in the sync-word storing unit 14 or the data stored in the pre-word storing unit 15. For example, the synchronization calculating unit 16 executes correlation calculation based on the digital data stored in the frame memory 13 and the data stored in the sync-word storing unit 14 or the data stored in the pre-word storing unit 15 and judges whether a correlation value obtained as a result of the calculation exceeds a predetermined threshold value. The synchronization calculating unit 16 outputs a predetermined synchronization timing signal at timing when the correlation value exceeds the predetermined threshold value and takes a maximum value. The synchronization timing signal outputted from the synchronization calculating unit 16 is used for processing digital data of a frame structure, in, for example, the baseband-signal processing unit 1 and other digital signal processing circuits.

The operation control unit 17 controls operations of the respective sections in the baseband-signal processing unit 1 on the basis of a communication status, an operation status, and the like in the mobile wireless communication apparatus 101. For example, the operation control unit 17 performs switching for setting arithmetic processing executed by the synchronization calculating unit 16 to establish synchronization as arithmetic processing using data stored in the sync-word storing unit 14 or arithmetic processing using the data stored in both the sync-word storing unit 14 and the pre-word storing unit 15.

Figure 4:
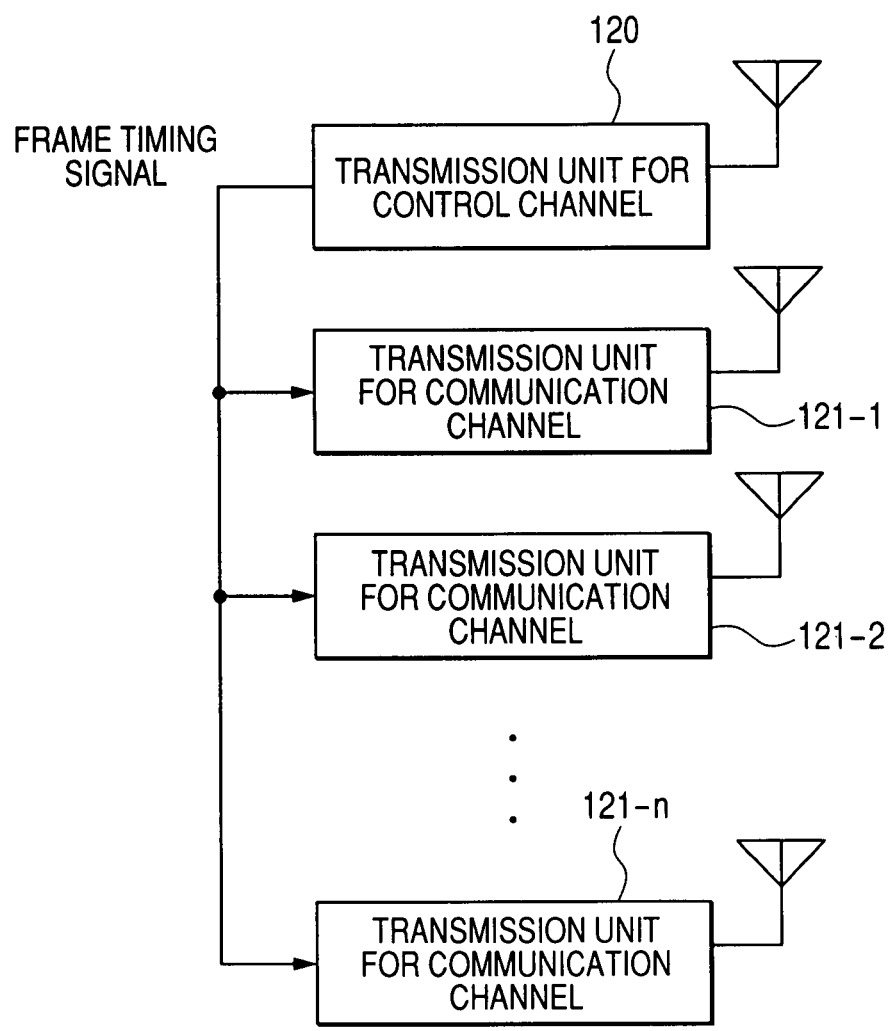
FIG. 4 is a diagram showing an example of a structure of a wireless communication control apparatus.

The wireless communication control apparatus 102 shown in FIG. 1 includes, for example, as shown in FIG. 4, a transmission unit for control channel 120 and plural transmission units for communication channel 121-1 to 121-$n$ ($n$ is an integer equal to or larger than 2). The transmission units for control channel 120 sends, using the control channel 110, an RF signal for transmitting digital data to each of the mobile wireless communication apparatuses 101. Each of the transmission units for communication channel 121-1 to 121-$n$ sends, using the physical communication channel 111, an RF signal for transmitting digital data to each of the mobile wireless communication apparatuses 101. A frame timing signal for synchronizing frames transmitted on the control channel 110 and the physical communication channel 111 is sent from the transmission unit for control channel 120 to each of the transmission units for communication channel 121-1 to 121-$n$. According to this frame timing signal, the frame of the control channel 110 and the frame of the physical communication channel 111 are sent at identical timing as indicated by a dotted line in FIGS. 2(A) and 2(B).

An operation of the mobile wireless communication apparatus 101 for acquiring synchronization in the mobile wireless communication system 100 according to the embodiment of the invention will be hereinafter explained. As an operation status (a status of synchronization) concerning synchronization in the mobile wireless communication apparatus 101, there are three operation statuses, namely, an initial synchronization status for establishing bit synchronization and frame synchronization, a synchronization maintaining status for maintaining frame timing after establishing synchronization, and a re-synchronization status for establishing synchronization again after synchronization is released once. In each of the mobile wireless communication apparatuses 101, an operation status concerning synchronization is specified by the operation control unit 17 included in the sync detection circuit 10 according to a communication status and the like and an operation of the synchronization calculating unit 16 is controlled according to the operation status specified.

More specifically, the operation control unit 17 performs judgment on whether synchronization is acquired using only the sync word SW according to the synchronization status concerning synchronization specified or synchronization is acquired using both the sync word SW and the pre-word PW. FIG. 5 is a table showing a correspondence relation among a radio channel to be a reception object, an operation status concerning synchronization in the mobile wireless communication apparatus 101, a method of acquiring synchronization, and a synchronization condition for judging that synchronization is established.

As shown in FIG. 5, in the case in which the control channel 110 is a reception object, when the operation status is the initial synchronization status or re-synchronization status, the operation control unit 17 performs synchronization acquisition using both the pre-word PW and the sync word SW. Since this is substantially equivalent to detection of frame timing using a long code pattern as the sync word SW, precision of synchronization is improved. Thus, in this case, as the synchronization condition, when a calculation result in the synchronization calculating unit 16 exceeds the predetermined threshold value only once, the operation control unit 17 only has to judge that both the pre-word PW and the sync word SW are successfully detected once and consider that synchronization is established. The synchronization condition only has to be changeable according to specifications of the mobile wireless communication system 100 and set to be surely smaller in the number of times compared with that in the past.

In the case in which the control channel 110 is a reception object, when the operation status is the synchronization maintaining status, acquisition of frame synchronization has already been completed on the side of the mobile wireless communication apparatus 101. Therefore, the operation control unit 17 only has to confirm that the sync word SW of each of the frames is successfully received at timing decided in advance. Thus, in this case, the operation control unit 17 only has to perform synchronization acquisition using only the sync word SW and, as the synchronization condition, when a calculation result exceeds the predetermined threshold value only once, judge that the sync word SW is successfully detected and consider that synchronization is maintained.

In the case in which the physical communication channel 111 is a reception object, the operation control unit 17 performs synchronization acquisition using only the sync word SW regardless of an operation status concerning synchronization. A section including the pre-word PW is not arranged in the frame of the physical communication channel 111 as shown in FIG. 2(B). On the other hand, as shown in FIG. 4, since a frame timing signal is sent from the transmission unit for control channel 120 to the respective transmission units for communication channel 121-1 to 121-$n$, the frame of the control channel 110 and the frame of the physical communication channel 111 are sent at identical timing. Therefore, when a reception object shifts from the control channel 110 to the physical communication channel 111 in the mobile wireless communication apparatus 101, if the physical communication channel 111 is received at the same frame timing as the timing of reception of the control channel 110, it is possible to acquire frame synchronization.

As a synchronization condition in the case in which the physical communication channel 111 is a reception object, when the operation status is the initial synchronization status or the synchronization maintaining status, when a calculation result in the synchronization calculating unit 16 exceeds the predetermined threshold only once, the operation control unit 17 only has to judge that the sync word is successfully detected and synchronization is established (or maintained). On the other hand, in the re-synchronization status in which re-synchronization is performed because of pulling out of synchronization or at the time of later participation in group call, synchronization precision may be deteriorated. Thus, in this case, as a synchronization condition, when a calculation result successively exceeds the predetermined threshold value plural times (e.g., twice), the operation control unit 17 only has to judge that the sync word SW is successfully detected plural times (e.g., twice) and consider that synchronization is established. In the re-synchronization status and at the time of later participation, the mobile wireless communication apparatus 101 is present in an environment close to a limit where a call using the physical communication channel 111 is established. Therefore, since the synchronization condition is made strict compared with those in the initial synchronization status and the synchronization maintaining status as described above, even if a slight delay occurs in establishment of synchronization, this does not lead to a significant problem.

When the direct communication channel 112 is a reception object, the preamble PA including the pre-word PW is arranged only at the front of a frame at the start of transmission. Thus, as a method of acquiring synchronization, the operation control unit 17 makes it possible to use both the method of using only the sync word SW and the method of using both the pre-word PW and the sync word SW. The operation control unit 17 only has to select a synchronization condition according to a method used. Specifically, when both the pre-word PW and the sync word SW are used, the operation control unit 17 only has to judge that both the pre-word PW and the sync word SW are successfully detected once when a calculation result in the synchronization calculating unit 16 exceeds the predetermined threshold value only once and consider that synchronization is established. On the other hand, when only the sync word SW is used, the operation control unit 17 only has to judge that the sync word SW is successfully detected plural times (e.g., twice) when a calculation result successively exceeds the predetermined threshold value plural times (e.g., twice) and consider that synchronization is established.

A specific example of arithmetic processing executed for establishing synchronization in the synchronization calculating unit 16 will be explained. Here, the number of symbols of the sync word SW is set as n, data of the sync word SW are set as S1 to Sn, and sampling data several symbols back to the past from a reception point in the baseband signal demodulated in the mobile wireless communication apparatus 101 are set as $a_1$ to $a_n$. It is possible to obtain a correlation value in this case according to a calculation indicated by Formula 1.

$$\sum_{i=0}^{n}(a_1 * b_i) \qquad \text{Formula 1}$$

Figure 6:
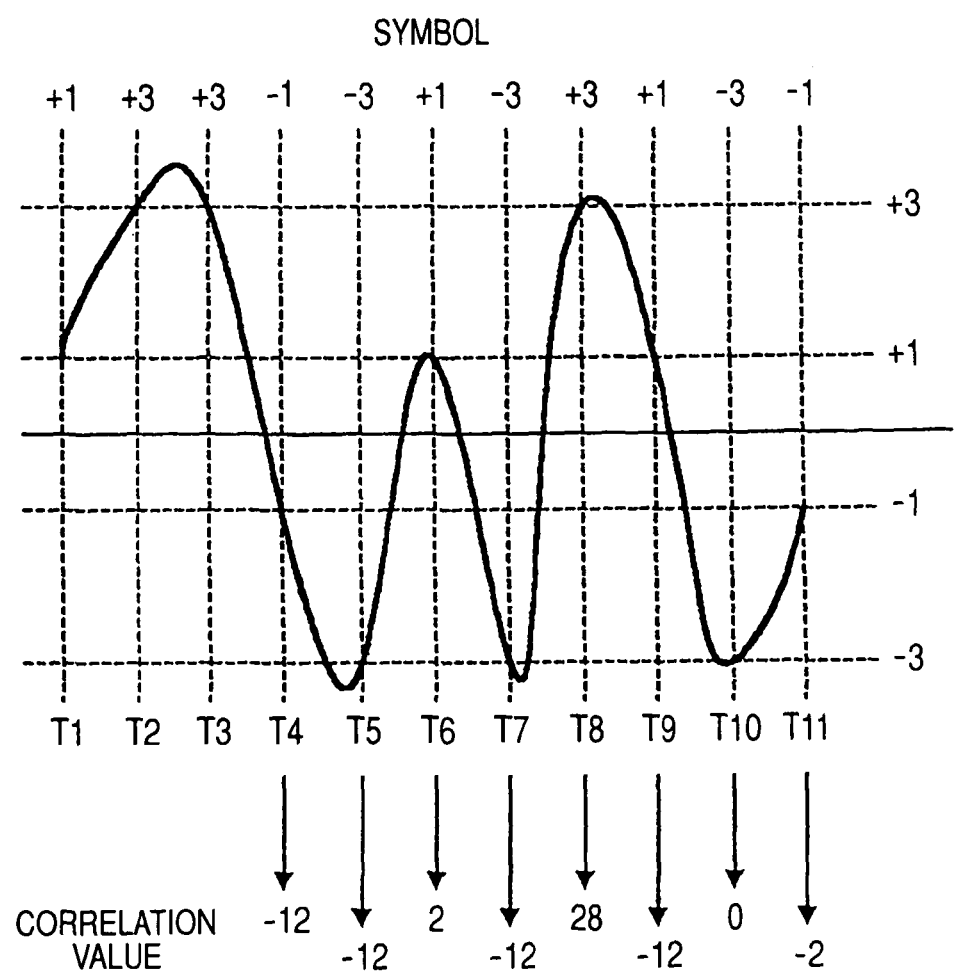
FIG. 6 is a diagram for explaining a specific example of arithmetic processing executed for establishing synchronization.

As a specific example, it is assumed that sync words S1 to S4 are −3, +1, −3, and +3, respectively. It is assumed that the baseband signal demodulated in the mobile wireless communication apparatus 101 has a waveform shown in FIG. 6. In an example shown in FIG. 6, it is assumed that sampling is performed once for one symbol.

In this case, correlation values obtained at timing T4 to T11 are compared with a threshold value decided in advance. It is possible to establish frame synchronization on the basis of a maximum point where the correlation value is larger than the threshold value. In the example shown in FIG. 6, since the correlation value is the largest at "28", it is possible to establish frame synchronization judging that timing T8 is reception timing for the sync word SW.

Sampling data twenty symbols back to the past from the reception point in the baseband signal demodulated in the mobile wireless communication apparatus 101 are set as $a_0$ to $a_{19}$, sync words SW stored in the sync-word storing unit 14 are set as $S_0$ to $S_9$, and pre-words PW stored in the pre-word storing unit 15 are set as $P_0$ to $P_9$. The threshold value for synchronization detection is Th1 when only the sync word SW is used and is Th2 when both the pre-word PW and the sync word SW are used. The correlation value is larger as a word length is larger. Thus, setting is performed in advance to set the thresholds Th1 and Th2 as Th1<Th2.

When synchronization is acquired using only the sync word SW, the synchronization calculating unit 16 specifies a correlation value C1 between the sampling data $a_{10}$ to $a_{19}$ and the data $S_0$ to $S_9$ indicating the sync words SW by executing a calculation using Formula 2.

$$C1 = \sum_{i=0}^{9}(a_{i+10} * S_i) \qquad \text{Formula 2}$$

Figure 7:
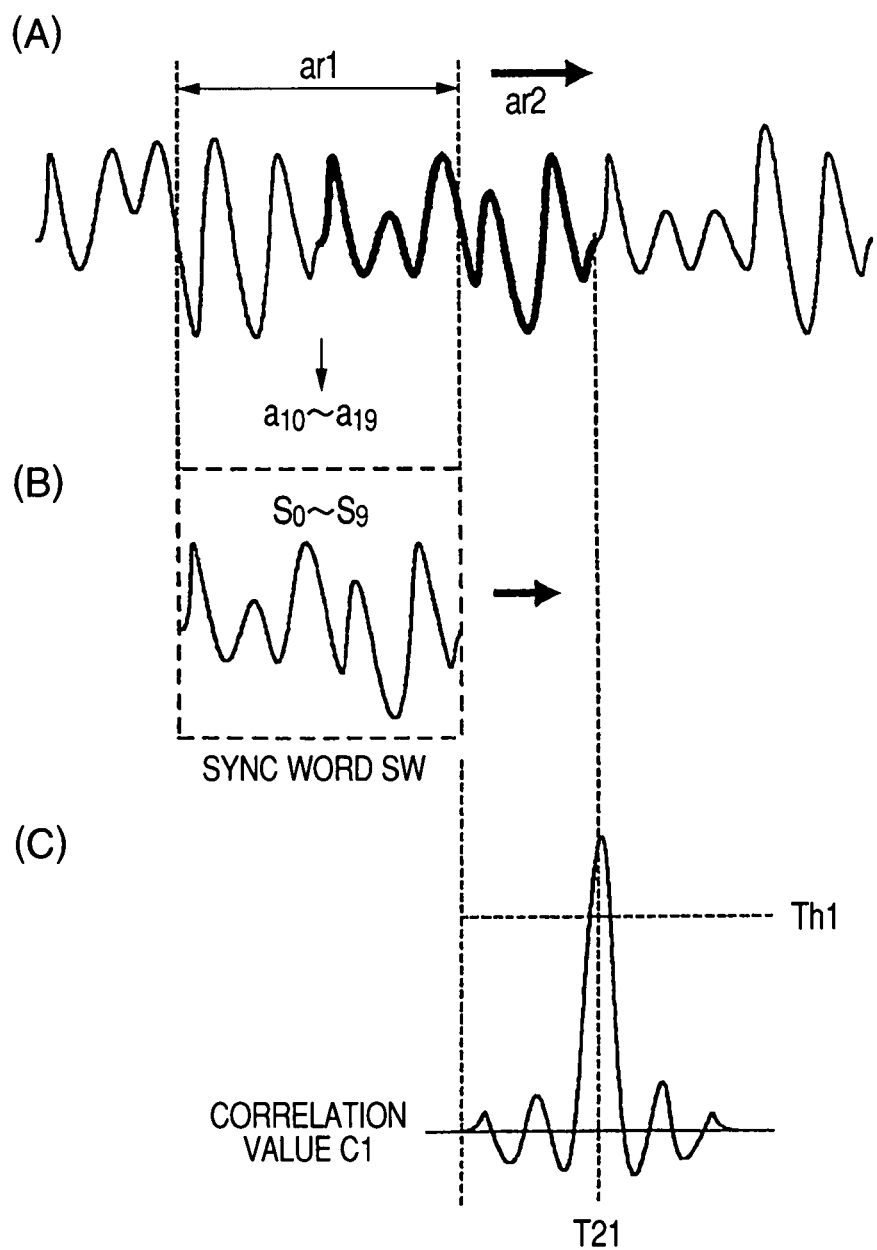
FIG. 7 is a diagram for explaining a specific example of an operation for acquiring synchronization using only a sync word.
Figure 9:
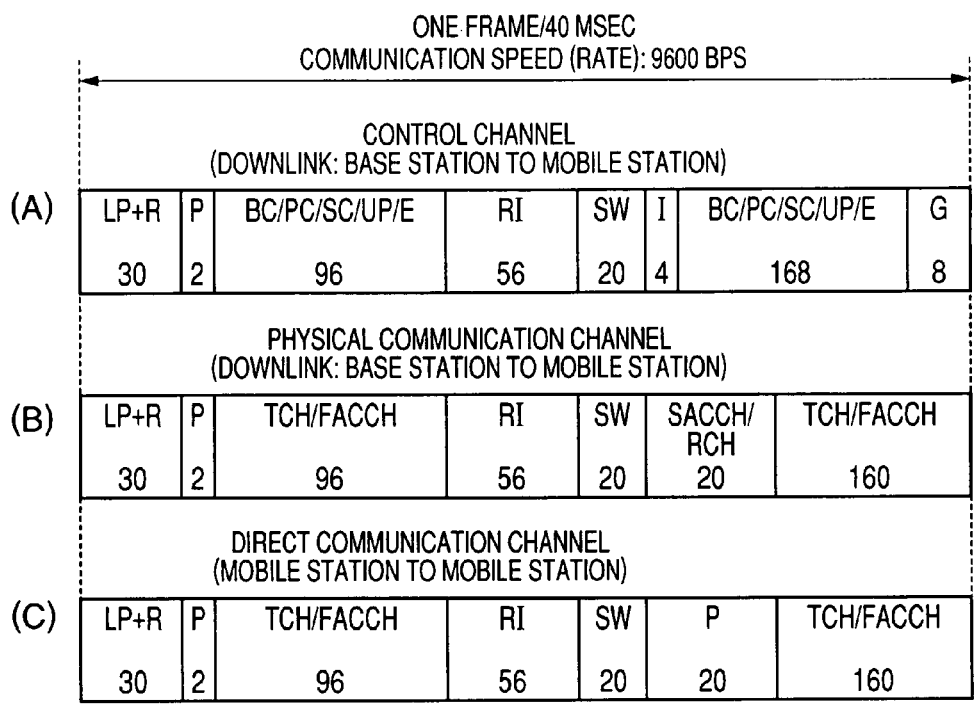
FIG. 9 is a diagram showing an example of a frame format in the past.

For example, when a baseband signal shown in FIG. 7(A) is demodulated by the reception processing unit 4, data sampled by the sampling circuit 11 in a period indicated by an arrow ar1 are sequentially stored in the frame memory 13 as the sampling data $a_{10}$ to $a_{19}$. The data $S_0$ to $S_9$ indicating a code pattern corresponding a waveform of the sync word SW shown in FIG. 7(B) are stored in advance in the sync-word storing unit 14. The synchronization calculating unit 16 executes arithmetic processing for specifying the correlation value C1 between the sampling data $a_{10}$ to $a_{19}$ stored in the frame memory 13 and the data $S_0$ to $S_9$ indicating the sync words SW stored in the sync-word storing unit 14. The period indicated by the arrow ar1 moves in the right direction (backward on a time axis) as time elapses as indicated by an arrow ar2 in FIG. 7(A). Sampled data are stored in the frame memory 13 in the FIFO system.

The correlation value C1 specified by the synchronization calculating unit 16 fluctuates in accordance with elapse of time as shown in FIG. 7(C). At timing T21 when the correlation value C1 exceeds the threshold value Th1, it is judged that the sync word SW is received. This makes it possible to establish frame synchronization.

When synchronization is acquired using both the pre-word PW and the sync word SW, the synchronization calculating unit 16 specifies the correlation value C1 between the sampling data $a_{10}$ to $a_{19}$ and the data $S_0$ to $S_9$ indicating the sync words SW by executing a calculation using Formula 2. The synchronization calculating unit 16 specifies a correlation value C2 between the sampling data $a_0$ to $a_9$ and the data $P_0$ to $P_9$ indicating the pre-words PW by executing a calculation using Formula 3.

$$C2 = \sum_{i=0}^{9} (a_i * P_i) \qquad \text{Formula 3}$$

For example, when a baseband signal shown in FIG. 8(A) is demodulated by the reception processing unit 4, data sampled by the sampling circuit 11 in a period indicated by an arrow ar3 are sequentially stored in the frame memory 13 as the sampling data $a_0$ to $a_{19}$. The period indicated by the arrow ar3 moves in the right direction (backward on a time axis) as time elapses as indicated by an arrow ar4 in FIG. 8(A). The data $S_0$ to $S_9$ indicating a code pattern corresponding to a waveform of the sync word SW shown in FIG. 8(B) are stored in advance in the sync-word storing unit 14. The data $P_0$ to $P_9$ indicating a code pattern corresponding to a waveform of the pre-word PW shown in FIG. 8(B) are stored in advance in the pre-word storing unit 15.

The synchronization calculating unit 16 executes arithmetic processing for specifying the correlation value C2 between the sampling data $a_0$ to $a_9$ stored in the frame memory 13 and the data $P_0$ to $P_9$ indicating the pre-words PW stored in the pre-word storing unit 15. At the same time, the synchronization calculating unit 16 executes arithmetic processing for specifying the correlation value C1 between the sampling data $a_{10}$ to $a_{19}$ stored in the frame memory 13 and the data $S_0$ to $S_9$ indicating the sync words SW stored in the sync-word storing unit 14. The correlation value C1 specified by the synchronization calculating unit 16 fluctuates in accordance with elapse of time as shown in FIG. 8(C). A sum C1+C2 of the correlation value C1 and the correlation value C2 also fluctuates in accordance with elapse of time as shown in FIG. 8(D). At timing T22 when a value of C1+C2 exceeds the threshold value Th2, it is judged that the sync word SW is received. This makes it possible to establish frame synchronization.

In the case in which the control channel 110 is a reception object, when the mobile wireless communication apparatus 101 is in the initial synchronization status for establishing synchronization, only processing for acquiring synchronization using both the pre-word PW and the sync word SW has to be executed. Thus, as shown in FIGS. 8(A) to 8(C), a maximum point where the value of the sum C1+C2 of the correlation values exceeds the threshold value Th2 is set as a synchronization point. This makes it possible to establish synchronization.

In the case in which the direct communication channel 112 is a reception object, when the mobile wireless communication apparatus 101 is in the initial synchronization status, both the processing for acquiring synchronization using both the pre-word PW and the sync word SW and the processing for acquiring synchronization using only the sync word SW have to be taken into account. In this case, as in the above case, it is possible to specify a synchronization point on the basis of comparison of the correlation value C1 and the threshold value Th1 and comparison of the sum C1+C2 of the correlation values and the threshold value Th2. By specifying the synchronization point according to such a simple calculation, it is possible to control an increase in a processing amount in the arithmetic processing by the synchronization calculating unit 16. When the correlation value C1 exceeds the threshold value Th1 and reaches the maximum value and the sum C1+C2 of the correlation values exceeds the threshold Th2 and reaches the maximum value, the synchronization condition in acquisition of synchronization using both the pre-word PW and the sync-word SW only has to be preferentially applied to judge that synchronization is established when, for example, the sum exceeds the threshold value Th2 only once.

A word length in a sync word may be shortened to cope with narrowing of a band of a radio channel and a large zone. In the invention, even when a sync word is reduced to 20 bits per 80 seconds, synchronization is acquired using both the pre-word PW and the sync word SW or using only the sync word SW appropriately according to an operation status concerning synchronization in the mobile wireless communication apparatus 101. Consequently, even when the word length in the sync word is shortened, it is possible to perform synchronization detection with high precision. Since the word length in the sync word is reduced, it is possible to quickly establish a communication link between the mobile wireless communication apparatus 101 and the wireless communication control apparatus 102 and among the plural mobile wireless communication apparatuses 101.

When synchronization is established or maintained using only the sync word SW, it is possible to reduce a processing amount and control power consumption by executing arithmetic processing for comparing the correlation value C1 and the threshold value Th1 in the synchronization calculating unit 16. Moreover, a frame of the control channel 110 and a frame of the physical communication channel 111 are sent at identical timing. A section including the pre-word PW is not arranged in the frame of the physical communication channel 111. In addition, the preamble PA including the pre-word PW only at the start of transmission is arranged in a frame of the direct communication channel 112. The preamble PA is not arranged in a frame sent after that. Consequently, in the physical communication channel 111 and the direct communication channel 112 that are susceptible to limitation due to information transmission speed (capacity), it is possible to reduce an amount of data transmitted for control and relax the limitation due to information transmission speed.

The synchronization calculating unit 16 is not limited to a unit that executes correlation calculation for establishing synchronization and may be any unit that can execute arbitrary arithmetic processing and establish synchronization. For example, it is also possible that Euclidean distances between sync words defined in advance and sampling data of a demodulated baseband signal are specified and a difference between the distances specified is squared to add an amount corresponding to the sync words to the distances.

The mobile wireless communication system 100 is not limited to the ground mobile wireless communication system of the large zone system and may be a micro-cell system. Moreover, the modulation system is not limited to the Quadrature FSK modulation system and only has to be an arbitrary digital multi-value modulation system. The communication system between the mobile wireless communication apparatus 101 and the wireless communication control apparatus 102 is not limited to the FDMA system. It is possible to directly apply the invention to the TDMA system as well.

INDUSTRIAL APPLICABILITY

It is possible to provide a mobile wireless communication system that can establish a communication link by reducing

The invention claimed is:

1. A mobile wireless communication apparatus, wherein the mobile wireless communication apparatus serves as a mobile station in a wireless communication system for performing radio communication by a radio signal transmitted on a predetermined radio channel between a base station and the mobile station, or between mobile stations, the predetermined radio channel is either a control channel or a physical communication channel to be used between the base station and the mobile station, or a direct communication channel to be used between the mobile stations,
   in the predetermined radio channel, the control channel provided from the base station is used to transmit the radio signal for transmitting digital data which has a plurality of consecutive frames, a sync word formed by a predetermined code pattern is arranged at the front of each of the frames, and a post field including a pre-word formed by a code pattern different from that of the sync word is arranged at the end of each of the frames,
   in the predetermined radio channel, the physical communication channel provided from the base station is used to transmit the radio signal for transmitting digital data which has a plurality of consecutive frames, and the sync word formed by the predetermined code pattern is arranged at the front of each of the frames,
   in the predetermined radio channel, the direct communication channel is used to transmit the radio signal for transmitting digital data which has a plurality of consecutive frames, a preamble including a pre-word arranged at the front of a first frame at the start of transmission, and the sync word is arranged at the front of each subsequent frame,
   the mobile station comprises:
   a demodulating unit configured to receive the radio signal transmitted on the predetermined radio channel and demodulate a baseband signal, and
   a frame synchronizing unit configured to detect at least a predetermined sync word from a symbol sequence represented by the baseband signal demodulated by the demodulating unit and acquire frame synchronization,
   when the baseband signal is demodulated by the demodulating unit from the radio signal transmitted on the control channel, when a status of synchronization is either initial synchronization or re-synchronization, the frame synchronizing unit judges that the frame synchronization is successfully acquired when both the sync word and the pre-word are detected once, and, when the status of synchronization is synchronization maintenance, the frame synchronizing unit judges that the frame synchronization is successfully acquired when the sync word is detected once,
   when the baseband signal is demodulated by the demodulating unit from the radio signal transmitted on the physical communication channel, when the status of synchronization is either initial synchronization or synchronization maintenance, the frame synchronizing unit judges that the frame synchronization is successfully acquired when the sync word is detected once, and, when the status of synchronization is re-synchronization, the frame synchronizing unit judges that the frame synchronization is successfully acquired when the sync word is detected a plurality of times, and
   when the baseband signal is demodulated by the demodulating unit from the radio signal transmitted on the direct communication channel, when a status of synchronization is either initial synchronization or re-synchronization, the frame synchronizing unit judges that the frame synchronization is successfully acquired when the sync word is detected a plurality of times or when the sync word and the pre-word are detected once, and, when the status of synchronization is synchronization maintenance, the frame synchronizing unit judges that the frame synchronization is successfully acquired when the sync word is detected once.

2. The mobile wireless communication apparatus according to claim 1, wherein, in the mobile station,
   when a first detection operation for detecting only the sync word is executed, the frame synchronizing unit compares a correlation value between the symbol sequence represented by the baseband signal demodulated by the demodulating unit and the sync word with a predetermined first threshold value, and judges that the sync word is successfully detected when it is judged that the correlation value exceeds the predetermined first threshold value, and
   when a second detection operation for detecting both the pre-word and the sync word is executed, the frame synchronizing unit compares a sum of the correlation value between the symbol sequence represented by the baseband signal demodulated by the demodulating unit and the sync word and a correlation value between the symbol sequence represented by the baseband signal demodulated by the demodulating unit and the pre-word with a predetermined second threshold value, and judges that the sync word and the pre-word are successfully detected when it is judged that the sum exceeds the predetermined second threshold value.

3. A communication processing method performed by a mobile wireless communication apparatus, wherein the mobile wireless communication apparatus serves as a mobile station in a wireless communication system for performing radio communication by a radio signal transmitted on a predetermined radio channel between a base station and the mobile station, or between mobile stations,
   the predetermined radio channel is either a control channel or a physical communication channel to be used between the base station and the mobile station, or a direct communication channel to be used between the mobile stations,
   in the predetermined radio channel, the control channel provided from the base station is used to transmit the radio signal for transmitting digital data which has a plurality of consecutive frames, a sync word formed by a predetermined code pattern is arranged at the front of each of the frames, and a post field including a pre-word formed by a code pattern different from that of the sync word is arranged at the end of each of the frames,
   in the predetermined radio channel, the physical communication channel provided from the base station is used to transmit the radio signal for transmitting digital data which has a plurality of consecutive frames, and the sync word formed by the predetermined code pattern is arranged at the front of each of the frames,
   in the predetermined radio channel, the direct communication channel is used to transmit the radio signal for transmitting digital data which has a plurality of consecutive frames, a preamble including a pre-word arranged at the front of a first frame at the start of transmission, and the sync word is arranged at the front of each subsequent frame, the method comprising:

the mobile station performing demodulation by receiving the radio signal transmitted on the predetermined radio channel and demodulating a baseband signal, and acquiring frame synchronization by detecting at least a predetermined sync word from a symbol sequence represented by the demodulated baseband signal, when the baseband signal is demodulated from the radio signal transmitted on the control channel, when a status of synchronization is either initial synchronization or re-synchronization, judging that the frame synchronization is successfully acquired when both the sync word and the pre-word are detected once, and, when the status of synchronization is synchronization maintenance, judging that the frame synchronization is successfully acquired when the sync word is detected once, when the baseband signal is demodulated from the radio signal transmitted on the physical communication channel, when the status of synchronization is either initial synchronization or synchronization maintenance, judging that the frame synchronization is successfully acquired when the sync word is detected once, and, when the status of synchronization is re-synchronization, judging that the frame synchronization is successfully acquired when the sync word is detected a plurality of times, when the baseband signal is demodulated from the radio signal transmitted on the direct communication channel, when a status of synchronization is either initial synchronization or re-synchronization, judging that the frame synchronization is successfully acquired when the sync word is detected a plurality of times or when the sync word and the pre-word are detected once, and, when the status of synchronization is synchronization maintenance, judging that the frame synchronization is successfully acquired when the sync word is detected once.

4. The communication processing method according to claim 3, wherein, in the mobile station, when a first detection operation for detecting only the sync word is executed, comparing a correlation value between the symbol sequence represented by the demodulated baseband signal and the sync word with a predetermined first threshold value, and judging that the sync word is successfully detected when the correlation value exceeds the predetermined first threshold value, and when a second detection operation for detecting both the pre-word and the sync word is executed, comparing a sum of the correlation value between the symbol sequence represented by the demodulated baseband signal and the sync word and a correlation value between the symbol sequence represented by the demodulated baseband signal and the pre-word with a predetermined second threshold value, and judging that the sync word and the pre-word are successfully detected when the sum exceeds the predetermined second threshold value.

* * * * *